United States Patent
Rintaluoma

(10) Patent No.: US 8,396,117 B2
(45) Date of Patent: Mar. 12, 2013

(54) APPARATUS, ARRANGEMENT, METHOD AND COMPUTER PROGRAM PRODUCT FOR DIGITAL VIDEO PROCESSING

(75) Inventor: Tero Rintaluoma, Oulu (FI)

(73) Assignee: Google Inc., Mountain View, CA (US)

( * ) Notice: Subject to any disclaimer, the term of this patent is extended or adjusted under 35 U.S.C. 154(b) by 1146 days.

(21) Appl. No.: 12/301,843

(22) PCT Filed: May 30, 2006

(86) PCT No.: PCT/FI2006/050223
§ 371 (c)(1),
(2), (4) Date: Nov. 21, 2008

(87) PCT Pub. No.: WO2007/138151
PCT Pub. Date: Dec. 6, 2007

(65) Prior Publication Data
US 2010/0246668 A1 Sep. 30, 2010

(51) Int. Cl.
*H04B 1/66* (2006.01)
*H04N 7/12* (2006.01)
*H04N 11/02* (2006.01)
*H04N 11/04* (2006.01)

(52) U.S. Cl. .............................. 375/240.02; 375/240.12

(58) Field of Classification Search .............. 375/240.2, 375/240.1, 240.12, 240
See application file for complete search history.

(56) References Cited

U.S. PATENT DOCUMENTS

| 5,675,384 A | | 10/1997 | Ramamurthy et al. |
| 6,141,053 A | * | 10/2000 | Saukkonen .............. 375/240.01 |
| 6,404,738 B1 | * | 6/2002 | Reininger et al. ............ 370/236 |
| 6,411,602 B2 | * | 6/2002 | Schoenblum et al. ........ 370/232 |
| 6,456,591 B1 | * | 9/2002 | Mishra .......................... 370/229 |
| 6,535,238 B1 | | 3/2003 | Kressin |

(Continued)

FOREIGN PATENT DOCUMENTS

| WO | 02/33979 | 4/2002 |
| WO | 02/062072 | 8/2002 |
| WO | 02/067590 | 8/2002 |

(Continued)

OTHER PUBLICATIONS

International Search Report dated Feb. 16, 2007, from corresponding PCT application.

(Continued)

*Primary Examiner* — Eleni A Shiferaw
*Assistant Examiner* — Jing Sims
(74) *Attorney, Agent, or Firm* — Young Basile Hanlon MacFarlane P.C.

(57) ABSTRACT

An apparatus, arrangement, method and computer program product for digital video processing encodes a video stream while dynamically adjusting the complexity level of the encoder. One apparatus includes a processor providing processing resources, a video encoder utilizing the resources to encode a digital video that includes a plurality of complexity levels used to encode video frames forming the video, a usage meter to measure repeatedly a usage level of the resources during running of the encoder, and an optimizer to direct repeatedly the encoder to utilize the resources adaptively by calculating a usage level of the resources for a plurality of the frames encoded before a current frame using the measured usage levels, comparing the calculated usage level to a predetermined level of the resources, and selecting one of the complexity levels to encode the current frame based on a comparison of the calculated usage level to the predetermined level.

22 Claims, 2 Drawing Sheets

U.S. PATENT DOCUMENTS

| | | | |
|---|---|---|---|
| 6,771,703 B1 * | 8/2004 | Oguz et al. | 375/240.03 |
| 6,937,770 B1 * | 8/2005 | Oguz et al. | 382/235 |
| 7,584,475 B1 * | 9/2009 | Lightstone et al. | 718/104 |
| 2006/0062481 A1 | 3/2006 | Suvanto | |
| 2006/0285598 A1 | 12/2006 | Tulkki | |
| 2007/0009034 A1 | 1/2007 | Tulkki | |

FOREIGN PATENT DOCUMENTS

| | | |
|---|---|---|
| WO | 02/078327 | 10/2002 |
| WO | 03/043342 | 5/2003 |

OTHER PUBLICATIONS

Vasudev Bhaskaran et al., "Chapter 6: The MPEG Video Standards", Image and Video Compression Standards—Algorithms & Architectures, Second Edition, 1997, pp. 179-230, Kluwer Academic Publishers.

Murat A. Tekalp, "Block-Based Methods", Digital Video Processing, Prentice Hall Processing Series, Aug. 12, 1995, pp. 95-116, Prentice Hall PTR.

* cited by examiner

APPARATUS, ARRANGEMENT, METHOD AND COMPUTER PROGRAM PRODUCT FOR DIGITAL VIDEO PROCESSING

FIELD

The invention relates to a digital video processing apparatus, an arrangement for digital video processing, a method for controlling a digital video processing apparatus, and a computer program product embodied on a distribution medium for controlling a digital video processing apparatus.

BACKGROUND

Digital video processing is a rapidly expanding field of technology. Processing platforms vary widely: from desktop PC's to portable mobile phones, for example.

Previous solutions in video encoding are based on fixed encoding parameters or algorithms. They are normally configured during initialization to produce a video with a certain image size, target bit rate and frame rate. In addition to this, video encoders may use selected encoding tools or algorithms during a capture process.

BRIEF DESCRIPTION OF THE INVENTION

The present invention seeks to provide an improved digital video processing apparatus, an improved arrangement for digital video processing, an improved method for controlling a digital video processing apparatus, and an improved computer program product embodied on a distribution medium for controlling a digital video processing apparatus.

According to an aspect of the invention, there is provided a digital video processing apparatus comprising: a processor to provide processing resources; a video encoder utilizing the processing resources to encode a digital video; a usage meter to measure repeatedly a usage level of the processing resources during the running of the video encoder; and an optimizer to direct repeatedly the video encoder to utilize the processing resources adaptively so that the usage level reaches a predetermined level.

According to another aspect of the invention, there is provided an arrangement for digital video processing, comprising: processing means for providing processing resources; video encoding means utilizing the processing means for encoding a digital video; usage metering means for measuring repeatedly a usage level of the processing means during the running of the video encoding means; and optimization means for directing repeatedly the video encoding means to utilize the processing means adaptively so that the usage level reaches a predetermined level.

According to another aspect of the invention, there is provided a method for controlling a digital video processing apparatus, comprising: providing processing resources; encoding a digital video; measuring repeatedly a usage level of the processing resources during the encoding of the digital video; and directing repeatedly the encoding of the digital video to utilize the processing resources adaptively so that the usage level reaches a predetermined level.

According to another aspect of the invention, there is provided a computer program product embodied on a distribution medium for controlling a digital video processing apparatus, the controlling comprising: providing processing resources; measuring repeatedly a usage level of the processing resources during the encoding of a digital video; and directing repeatedly the encoding of the digital video to utilize the processing resources adaptively so that the usage level reaches a predetermined level.

The invention provides at least the advantage that the use of the video encoder is optimized as regards the usage of the processing resources in general.

LIST OF DRAWINGS

Embodiments of the invention are described below by way of example and with reference to the attached drawings, in which FIGS. 1A, 1B and 1C illustrate various embodiments of digital video processing apparatuses;

DESCRIPTION OF EMBODIMENTS

Figure 1A:
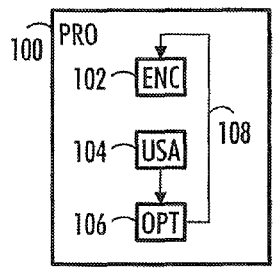

With reference to FIG. 1A, let us examine an embodiment of a digital video processing apparatus. Such an apparatus may also comprise other structures and functions than those described, but since they are not relevant to the present matter they will not be further described herein. It suffices to say that digital video processing apparatuses may be stand-alone devices or embedded in many different kinds of devices. Such devices include digital cameras, subscriber terminals of radio systems, and other types of hand-held devices, for example; the described embodiments are not restricted to the devices mentioned herein.

The video processing apparatus comprises a processor 100 to provide processing resources. The processor 100 may include a single microprocessor or a cluster of microprocessors, for example. Besides that, specialized signal processors and/or application-specific integrated circuits may implement certain functions requiring high processing capacity.

Figure 2:
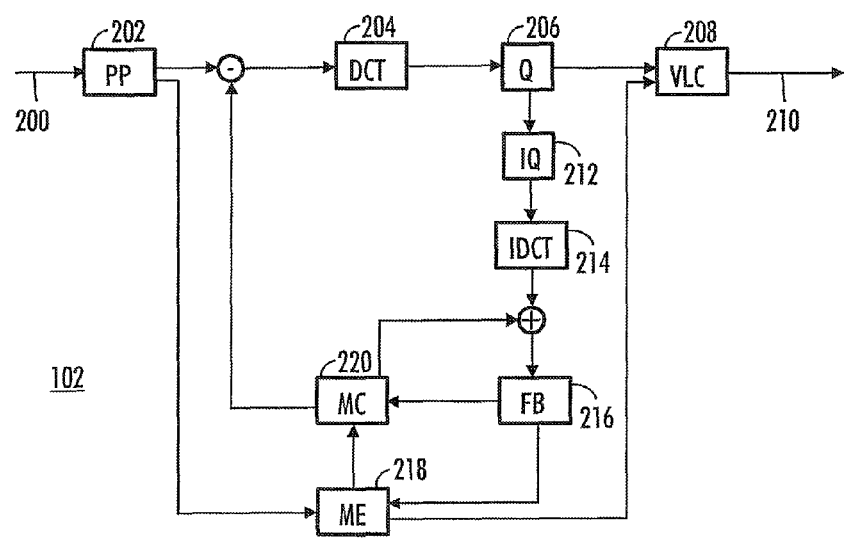
FIG. 2 is an overview of a video encoder.

The video processing apparatus further comprises a video encoder 102 utilizing the processing resources to encode a digital video. The video encoder 102 may be run in the processor 100. FIG. 2 presents an overview of a video encoder 102 embodiment. Digital video encoding is well known to a person skilled in the art from standards and textbooks, for instance from the following works which are incorporated herein by reference: Vasudev Bhaskaran and Konstantinos Konstantinides: *Image and Video Compressing Standards—Algorithms and Architectures*, Second Edition; and Kluwer Academic Publishers 1997, Chapter 6: The MPEG video standards, and *Digital Video Processing*, Prentice Hall Signal Processing Series, Chapter 6: *Block Based Methods*. Embodiments of video encoders 102 are also disclosed in the Applicant's other applications: WO 02/33979 A1, WO 02/062072 A1, WO 02/067590 A1, WO 02/078327 A1, WO 03/043342 A1, U.S. Ser. No. 10/944,856, U.S. Ser. No. 11/154,643 and U.S. Ser. No. 11/172,972 incorporated herein as references.

FIG. 2 describes the function of the (mpeg-4 type) video encoder 102 on a theoretical level. In practice, the structure is more complicated since necessary prior art features, such as timing and block-wise processing, are added to it.

A digital video to be encoded is typically a video sequence made of individual successive images. A camera may form a matrix presenting the images as pixels. Luminance and chrominance may have separate matrices. The data flow that presents the image as pixels is supplied to the encoder 102. It is also feasible to build a device where the data flow is transmitted to the encoder 102 along a data transmission connection, for example, or from the memory means of a computer. In such a case, the purpose is to compress an uncompressed digital video with the encoder 102 for forwarding or storage. The compressed video formed by the encoder 102 may be transmitted along a channel to a decoder. In principle, the decoder performs the same functions as the encoder 102 when it forms the video, only inversely. The channel may be, for example, a fixed or a wireless data transmission connection. The channel may also be interpreted as a transmission path which is used for storing the video in a memory means, for example on a laser disc, and by means of which the video is read from the memory means and processed in the decoder. Encoding of another kind may also be performed on the compressed video to be transmitted on the channel, for example channel coding by a channel coder. A channel decoder decodes the channel coding. The encoder 102 and decoder may also be combined to make a video codec.

A digital video 200 arrives at a pre-processing phase 202, from where it continues image by image and block by block into encoding phases. The pre-processing phase 202 may be used to filter or convert a captured image from the camera to a suitable form for the encoder 102. The first encoded image is rearranged into a frame buffer 216. When a second input image arrives at the pre-processing phase 202, a motion estimation block 218 begins to estimate the motion, synchronized block by block to the encoding phase, between the first and second images. The block to be encoded is taken from the present image, and the reference block, i.e. search area, is taken from the previous image. Full search methods may be used in motion estimation, which means that a block is fitted into a search area with every possible motion vector starting from the upper left corner, for instance. The encoding mode may be intra-coding or inter-coding. No motion compensation is performed on an intracoded image whereas an inter-coded image is compensated for motion. Usually the first image is intra-coded and the following images are inter-coded. Intra-images may also be transmitted after the first image if, for example, no sufficiently good motion vectors are found for the image to be encoded. The motion estimation block 218 tries to find a motion model between the current image and the previously coded image. The result of the motion estimation block 218 is the best motion vector candidate. A motion compensation block 220 describes the difference between consecutive frames in terms of where each section of the previous frame has moved. For a coded image, a discrete cosine transform block 204, a quantization block 206 and a variable length coder 208 are needed in order to produce a coded bit stream 210. An inverse quantization block 212 and an inverse discrete cosine transform block 214 are used to reconstruct the image to the frame buffer 216.

Having explained FIG. 2, the description of FIG. 1A may now be resumed. The digital video processing apparatus comprises a usage meter 104 to measure repeatedly a usage level of the processing resources during the running of the video encoder 102. All processing power provided by the apparatus is not used all the time in video coding applications, especially in case of small picture sizes and frame rates. Available idle time of the processor 100 may be taken into use to produce a better quality video. This may be done with more extensive or better motion estimation algorithms, for example.

If the operating system used in the device cannot provide CPU load information or the amount of the idle process to the video encoder 102 directly, it is possible to create a separate measurement process or thread for the usage meter 104. Priority may be selected for the measurement process or thread so that it is the lowest one in the system but still above the idle process priority. Obtained run time of the measurement process in the system is proportional to the CPU usage level and may therefore be used to measure the CPU usage. If the system is heavily loaded, the measurement process gets very little processing time but otherwise it gets much more processing time. The implementation of the usage meter 104 depends on the used operating system and platform. Also, information obtained from performance counter registers of the processor 100 or platform may be used to measure the actual CPU load of the system.

The digital video processing apparatus also comprises an optimizer 106 to direct 108 repeatedly the video encoder 102 to utilize the processing resources adaptively so that the usage level reaches a predetermined level. In an embodiment described later in detail with reference to FIG. 4, the optimizer 106 further directs the video encoder 102 to utilize more processing resources for additional video encoding features enhancing the quality of the video encoding so that the usage level rises to the predetermined level. In an opposite embodiment, the optimizer 106 further directs the video encoder 102 to utilize less processing resources so that the usage level goes down to the predetermined level.

Figure 1B:
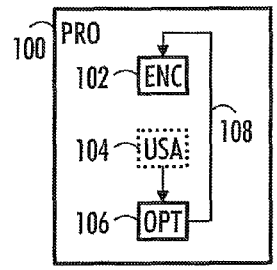
Figure 1C:
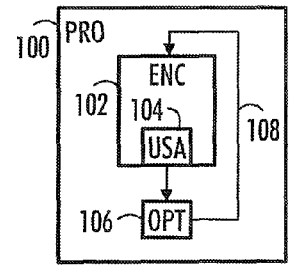

As illustrated in FIG. 1A, the usage meter 104 may be a separate measurement process. FIG. 1B illustrates an alternative solution: the usage meter 104 may also be implemented to an operating system or another system service directly providing information on the present CPU usage. As an alternative to FIGS. 1A and 1B, the usage meter 104 (as a separate measurement process, or implemented to an operating system or another system service) may also provide the usage level via the video encoder 102 to the optimizer 106. FIG. 1C further illustrates an alternative solution: the usage meter 104 may be a part of the video encoder 102. However, the structure of the video processing apparatus is not restricted to the embodiments shown in FIGS. 1A, 1B and 1C; depending on the implementation environment, the usage meter 104 may also be combined with the optimizer 106. The implementation may also be such that all three parts 102, 104 and 106 form a single component.

The optimization may be used to provide better quality in signal processing applications by adaptively selecting most suitable algorithms to produce as good a quality as possible with the currently available processing power. Modern communication devices with video capabilities may provide enough processing power to produce video clips with image sizes up to VGA resolution. However, for multimedia messaging (MMS) compatible video clips with small image sizes and bit rates, like QCIF (Quarter Common Intermediate Format), 15 fps (frames/second) and 64 kbps (kilobits/second), most of the processing power is not used at all. This unused processing power may be taken into use by automatically selecting more CPU-intensive algorithms to achieve a much better video quality. In an embodiment, information on the CPU usage level is used to select encoding algorithms so that the best video quality possible with the current resources is provided. The most suitable performance/quality level may be selected adaptively without user interaction.

The video encoder 102 may have several different complexity levels of the algorithms, which provide different performance/quality tradeoffs. Let us study FIG. 4. The video is first encoded with the following parameters: QCIF, 15 fps and 64 kbps. After encoding a few frames, the optimizer 106 obtains information from the usage meter 104 stating that the CPU usage is only between 40 to 50% (the peak signal noise ratio PSNR is about 30 dB), as illustrated by curve 402. The optimizer 106 orders a CPU adaptation 404 so that the video encoder 102 starts to use better and more CPU-intensive algorithms with the result that the CPU usage raises to a level around 70% (PSNR raises to a level around 33 dB), as illustrated by curve 406.

Figure 4:
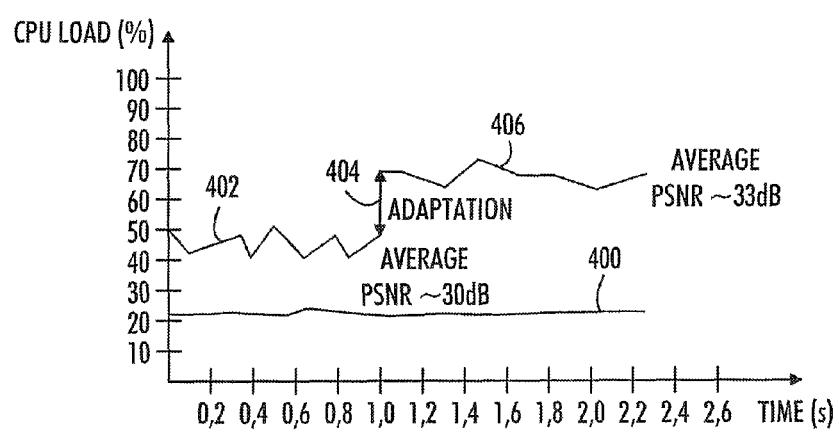
FIG. 4 illustrates adaptation during video encoding.

FIG. 4 also illustrates the concept of the usage level of the processing resources during the running of the video encoder 102: curve 400 illustrates the usage level caused by all other processes except the processes related to the video encoding, and curves 402 and 406 illustrate the usage level caused by all processes including the processes related to the video encoding. It may roughly be estimated from FIG. 4 that all other processes cause a CPU load of 20%, and the processes related to the video encoding cause a CPU load of 25% before the adaptation, and a CPU load of 40% after the adaptation.

Figure 5:
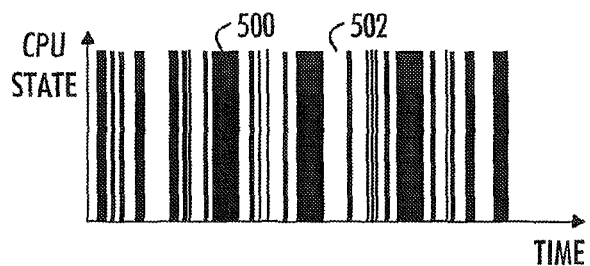
FIG. 5 illustrates the way the processing resources may be divided into processing time slices.

In an embodiment, the usage meter 104 measures the usage level so that the processing resources divided into processing time slices are averaged over a predetermined period of time. FIG. 5 illustrates the way the processing resources may be divided into processing time slices: the x axis illustrates the time and the y axis illustrates the CPU state. The allowed values for the CPU state are: running, denoted by a black bar 500, and idle, denoted by a white bar 502. FIG. 4 illustrates the usage levels averaged over a predetermined amount of time.

The usage meter 104 may measure the usage level so that the idle processing resources of the processor 100 are measured. In FIG. 4, the measured idle processing resources may be a little over 50% before the adaptation and a little over 30% after the adaptation.

The optimizer 106 may direct the video encoder 102 to utilize the processing resources so that the usage level leaves the predetermined level of the processing resources idle. In FIG. 4, the predetermined level may be 30%. The idle processing resources may work as back-up resources in case another process belonging to the curve 400 happens to need more resources.

Image quality is a really important criteria in video coding. That is why it is important to use as good compression methods as possible to produce a high quality video, because lost information in video compression cannot be added later. This means that we may have to use more CPU-intensive algorithms and this may increase the power consumption of the device a little. However, this increase in power consumption is usually negligible in comparison with the improvements in video quality. The device battery may be charged, so it has only a temporary effect, but the video quality is final.

A video with bad image quality has normally several artifacts: blocking effects, low PSNR, missing details, etc. Quality may be improved in several ways. In the motion estimation process, quality may be improved by using a full search method instead of three-step or diamond search methods. Also, search area in motion estimation may be made bigger (longer motion vectors may be allowed) or quarter-pixel accuracy may be used instead of full- or half-pixel accuracy. Pre-processing may be used to filter noise from the captured images. An in-loop deblocking filter may be added to the video encoder 102. The optimizer 106 may also direct the video encoder 102 to utilize other known methods for enhancing the quality of video encoding, such as intra-prediction or video stabilization.

The video encoder 102, the usage meter 104 and the optimizer 106 may also be implemented as a computer program product embodied on a distribution medium for controlling a digital video processing apparatus, the controlling comprising: providing processing resources; measuring repeatedly a usage level of the processing resources during the encoding of a digital video; and directing repeatedly the encoding of the digital video to utilize the processing resources adaptively so that the usage level reaches a predetermined level. In that case, the described functionality/structures may be implemented as software modules and/or processes, or as other structures used in the art of computer programming. The distribution medium may be any non-transitory means for distributing software to customers, such as a program storage medium, a (computer readable) memory or a software distribution package. The computer program product may also be distributed via transitory mediums such as a signal or a telecommunications signal.

Figure 3:
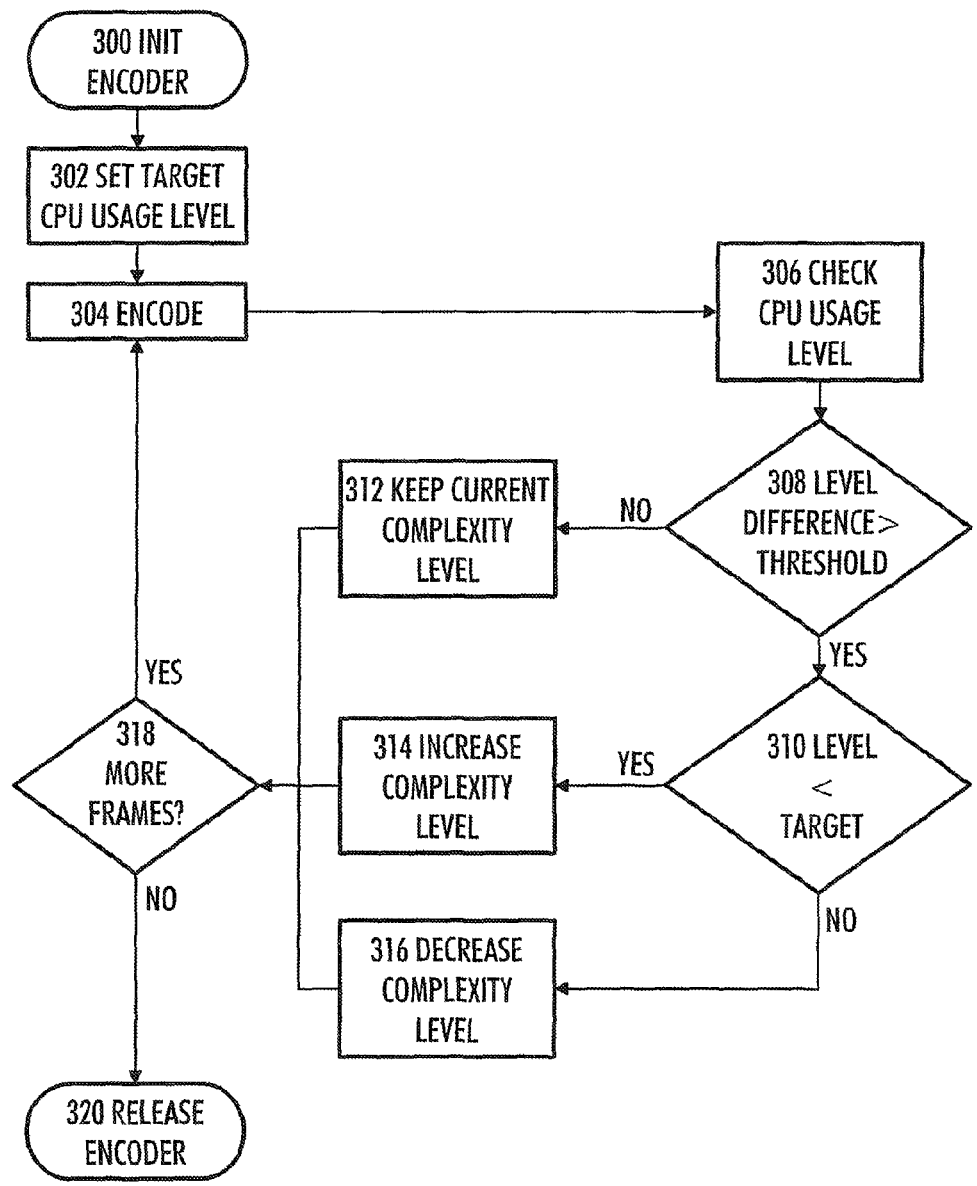
FIG. 3 is a flow-chart illustrating an embodiment of a method for controlling a digital video processing apparatus.

With reference to FIG. 3, an embodiment of a method for controlling a digital video processing apparatus is explained. In 300, the video encoder is initialized with given video properties and with a default performance/quality level. In 302, a target CPU usage level is set. In 304, encoding is started. In 306, an average CPU usage is calculated with the current performance/quality level. In order to prevent instable operation, a threshold may be used for the operation in 308: only if the averaged CPU usage differs from the target CPU level by more than the threshold value, a further check is made in 310, otherwise the current complexity level of encoding is kept in 312, i.e. no CPU load adaptation is performed.

In 310, if the CPU usage is less than the target CPU level, an adaptation is done in 314 by selecting a better quality level, otherwise an adaptation is done in 316 by decreasing the quality level.

After the adaptation decision it is checked whether there is a frame left to be encoded in 318: if there is, the operation is continued in 304, otherwise the encoder is released in 320.

In an embodiment, there may be five different complexity levels in the video encoder 102, for example:

level 1: basic encoding tools;
level 2: level 1 tools+in-loop deblocking filter;
level 3: level 2 tools+four new Intra-prediction modes;
level 4: level 3 tools+quarter-pixel accuracy in motion estimation; and
level 5: level 4 tools+full search motion estimation method.

A default complexity level in the video encoder 102 may be level 2, for example. The CPU load adaptation may then run as follows:

1) Initialize the video encoder 102 for a video stream of QCIF, 15 fps and 64 kbps.
2) Set a target CPU usage level to 70%.
3) Start encoding with encoding complexity level 2.
4) Encode 5 frames of video.
5) Check the average CPU usage: 40%.
6) Change encoding complexity level to level 3.
7) Encode 5 more frames.
8) Check the average CPU usage: 65%.
9) Change encoding complexity level to level 4.
10) Encode 5 more frames.
11) Check average CPU usage: 80%.
12) Change encoding complexity level to level 3.
13) Encode 5 more frames.
14) Check the average CPU usage: 62%.
15) Keep the present encoding complexity level (level 3).
16) Encode 5 more frames.

The operation may continue as described adaptively until the encoding of the digital video is finished.

Even though the invention has been described above with reference to an example according to the accompanying drawings, it is clear that the invention is not restricted thereto but can be modified in several ways within the scope of the appended claims.

The invention claimed is:

1. A digital video processing apparatus comprising:
a processor to provide processing resources;
a video encoder utilizing the processing resources to encode a digital video, the video encoder including a plurality of complexity levels used to encode video frames forming the digital video;
a usage meter to measure repeatedly a usage level of the processing resources during the running of the video encoder; and
an optimizer to direct repeatedly the video encoder to utilize the processing resources adaptively by calculating a usage level of the processing resources for a plurality of the video frames encoded before a current video frame using the measured usage levels, comparing the calculated usage level to a predetermined level of the processing resources, and selecting one of the plurality of complexity levels to encode the current video frame based on a comparison of the calculated usage level to the predetermined level;
wherein the plurality of complexity levels comprises at least a first complexity level using a motion estimation process with less than a full search method and a second complexity level using a motion estimation process with the full search method.

2. The digital video processing apparatus of claim 1, wherein the optimizer further directs the video encoder to select a complexity level of the plurality of complexity levels for encoding the current video frame that requires more processing resources for additional video encoding features enhancing the quality of the video encoding so that the usage level rises when the calculated usage level is below the predetermined level by more than a threshold amount.

3. The digital video processing apparatus of claim 1, wherein the optimizer further directs the video encoder to select a complexity level of the plurality of complexity levels for encoding the current video frame that requires less processing resources so that the usage level goes down when the calculated usage level is above the predetermined level by more than a threshold amount.

4. The digital video processing apparatus of claim 1, wherein the calculated usage level is an average of the measured usage levels over a predetermined period of time, the measured usage levels represented by processing time slices.

5. The digital video processing apparatus of claim 1, wherein the predetermined level represents a desired level of the processing resources to be left idle by the video encoder during the running of the video encoder.

6. The digital video processing apparatus of claim 1, wherein the optimizer further directs the video encoder to maintain a complexity level used to encode the plurality of the video frames encoded before the current video frame to encode the current video frame when the calculated usage level does not differ from the predetermined level by more than a threshold amount.

7. A system for digital video processing, comprising:
processing means for providing processing resources;
video encoding means utilizing the processing means for encoding a digital video, the video encoding means including a plurality of complexity levels used to encode video frames forming the digital video;
usage metering means for measuring repeatedly a usage level of the processing means during the running of the video encoding means; and
optimization means for directing repeatedly the video encoding means to utilize the processing means adaptively by selecting one of the plurality of complexity levels to encode a current video frame based on a comparison of the usage level of the processing resources for a plurality of the video frames encoded before the current video frame to a predetermined level of the processing resources;
wherein the plurality of complexity levels comprises at least a first complexity level using a motion estimation process with less than a full search method and a second complexity level using a motion estimation process with the full search method.

8. The system of claim 7, wherein the optimization means further directs the video encoding means to utilize a complexity level of the plurality of complexity levels that has additional video encoding features enhancing the quality of the video encoding over a complexity level of the plurality of complexity levels used to encode the plurality of video frames encoded before the current video frame so that the usage level rises when the usage level of the processing resources for the plurality of the video frames encoded before the current video frame is below the predetermined level by more than a threshold amount.

9. The system of claim 7, wherein the optimization means further directs the video encoding means to utilize a complexity level of the plurality of complexity levels that has fewer video encoding features enhancing the quality of the video encoding over a complexity level of the plurality of complexity levels used to encode the plurality of video frames encoded before the current video frame so that the usage level goes down when the usage level of the processing resources for the plurality of the video frames encoded before the current video frame is above the predetermined level by more than a threshold amount.

10. The system of claim 7, wherein the usage metering means measures the usage level so that idle processing resources of the processing means are measured.

11. A method for controlling a digital video processing apparatus, comprising:
encoding a digital video using at least one of a plurality of complexity levels, each of the plurality of complexity levels defining a different algorithm for encoding video frames forming the digital video, and the encoding of the digital video performed by processing resources of a processor;
measuring repeatedly a usage level of the processing resources during the encoding of the digital video; and
directing repeatedly the encoding of the digital video to utilize the processing resources adaptively by selecting one of the plurality of complexity levels to encode a current video frame based on a comparison of the usage level of the processing resources for a plurality of the video frames encoded before the current video frame to a predetermined level of the processing resources;
wherein the plurality of complexity levels comprises at least a first complexity level using a motion estimation process with less than a full search method and a second complexity level using a motion estimation process with the full search method.

12. The method of claim 11, wherein the directing further comprises:
directing the encoding of the digital video to utilize more processing resources for additional video encoding features enhancing the quality of the video encoding so that the usage level rises by selecting a more processing-intensive encoding algorithm from the plurality of complexity levels to encode the current video frame than an encoding algorithm from the plurality of complexity levels used to encode the plurality of video frames encoded before the current video frame when the calculated usage level is below the predetermined level by more than a threshold amount.

13. The method of claim 11, wherein the directing further comprises:
    directing the encoding of the digital video to utilize less processing resources so that the usage level goes down by selecting a less processing-intensive encoding algorithm from the plurality of complexity levels to encode the current video frame than an encoding algorithm from the plurality of complexity levels used to encode the plurality of the video frames encoded before the current video frame when the calculated usage level is above the predetermined level by more than a threshold amount.

14. The method of claim 11, wherein the measuring further comprises:
    generating the measured usage levels as processing time slices of the processing resources representing a first running state of the processing resources and a second idle state of the processing resources, the method further including:
    averaging the processing time slices over a predetermined period of time to calculate the usage level used for the comparison.

15. The method of claim 11, wherein the measuring further comprises:
    measuring the usage level so that idle processing resources are measured.

16. The method of claim 15, wherein the predetermined level is based on a desired level of the idle processing resources.

17. The method of claim 11, wherein encoding the digital video comprises encoding the plurality of video frames encoded before the current video frame using a default encoding algorithm having a default complexity level, the plurality of complexity levels including at least one encoding algorithm more processing intensive than the default encoding algorithm and at least one encoding algorithm less processing intensive than the default encoding algorithm.

18. A computer program product embodied on a non-transitory distribution medium for controlling a digital video processing apparatus, the controlling comprising:
    measuring repeatedly a usage level of processing resources utilized during encoding of a digital video to generate a plurality of measured usage levels; and
    directing repeatedly the encoding of the digital video to utilize the processing resources adaptively by:
        calculating an average usage level of the processing resources for a plurality of the video frames encoded before a current video frame using the plurality of measured usage levels;
        comparing the average usage level to a predetermined level of the processing resources; and
        selecting one of a plurality of complexity levels to encode the current video frame of the digital video based on an existing complexity level of the plurality of complexity levels used to encoding the plurality of video frames encoded before the current video frame and a comparison of the average usage level to the predetermined level;
    wherein the plurality of complexity levels comprises at least a first complexity level using a motion estimation process with less than a full search method and a second complexity level using a motion estimation process with the full search method.

19. The computer program product of claim 18, wherein the selecting further comprises:
    selecting a new complexity level to encode the current video frame that utilizes more processing resources for additional video encoding features enhancing the quality of the video encoding than those used by the existing complexity level so that the usage level rises when the average usage level is below the predetermined level by more than a threshold amount;
    selecting a new complexity level to encode the current video frame that utilizes less processing resources than those used by the existing complexity level so that the usage level goes down when the average usage level is above the predetermined level by more than the threshold amount; and
    selecting the existing complexity level to encode the current video frame when the average usage level does not differ from the predetermined level by more than the threshold amount.

20. The computer program product of claim 18, wherein the directing further comprises:
    directing the encoding of the digital video to utilize the processing resources so that the usage level leaves the predetermined level of the processing resources idle.

21. The computer program product of claim 18, wherein the existing complexity level is a default complexity level and the plurality of complexity levels includes at least one encoding algorithm more processing intensive than the existing complexity level and at least one encoding algorithm less processing intensive than the existing complexity level.

22. The computer program product of claim 18, wherein the plurality of complexity levels includes at least five different complexity levels.

* * * * *